(12) United States Patent
Gebke

(10) Patent No.: US 6,565,430 B2
(45) Date of Patent: May 20, 2003

(54) PLIABLE AIR DUCT WITH DUST AND CONDENSATION REPELLENCY

(75) Inventor: Kevin Gebke, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 09/951,717

(22) Filed: Sep. 13, 2001

(65) Prior Publication Data

US 2003/0050007 A1 Mar. 13, 2003

(51) Int. Cl.$^7$ ................................................ F24F 7/00
(52) U.S. Cl. .................... 454/306; 454/296; 454/903
(58) Field of Search ............................. 454/284, 296, 454/306, 903

(56) References Cited

U.S. PATENT DOCUMENTS

| | | | |
|---|---|---|---|
| 3,195,296 A | 7/1965 | Janson | 55/298 |
| 3,357,088 A | 12/1967 | Hoffman | 454/306 X |
| 5,095,942 A * | 3/1992 | Murphy | 137/561 A |
| 5,111,739 A | 5/1992 | Hall | 454/306 |
| 5,123,595 A | 6/1992 | Doss | 237/46 |
| 5,167,577 A | 12/1992 | Kristensson | 454/298 |
| 5,368,341 A * | 11/1994 | Larson | 285/260 |
| 5,490,813 A | 2/1996 | Danielsen | 454/306 |
| 5,655,963 A | 8/1997 | Paschke | 454/297 |
| 5,725,427 A * | 3/1998 | Koerber | 454/296 |
| 5,769,708 A | 6/1998 | Paschke | 454/306 |
| 5,855,154 A * | 1/1999 | Schakel et al. | 83/23 |
| 5,961,044 A | 10/1999 | Dalbec | 239/77 |
| 5,996,281 A | 12/1999 | Takano | 49/26 |
| 6,002,333 A | 12/1999 | Hickey | 340/550 |
| 6,280,320 B1 | 8/2001 | Paschke | 454/298 |

FOREIGN PATENT DOCUMENTS

| | | | |
|---|---|---|---|
| EP | 0175892 | 4/1986 | F24F/13/02 |
| EP | 0840072 | 5/1998 | F24F/13/06 |
| EP | 0899519 | 3/1999 | F24F/13/068 |
| FR | 2713317 | 6/1995 | F24F/7/05 |
| JP | 63-003143 | 1/1988 | F24F/13/02 |
| JP | 03-110342 | 5/1991 | F24F/13/02 |
| JP | 06094295 | 4/1994 | |

* cited by examiner

Primary Examiner—Derek Boles
(74) Attorney, Agent, or Firm—Marshall, Gerstein & Borun

(57) ABSTRACT

A fabric air duct with main discharge openings includes additional, much smaller openings that help ventilate the surface of the duct. Ventilating the surface of the duct with a slight yet even amount of airflow helps inhibit the accumulation of condensate and dust on the surface of the duct. In some embodiments, the duct includes a pliable sheet consisting of a rather porous fabric base material. To achieve an appropriately low level of airflow, a plastic coating on the fabric reduces, but does not eliminate the fabric's porosity. A calendering process then reduces the porosity even further. In other embodiments, the pliable sheet is substantially air impermeable, except for its main discharge openings. The sheet is then perforated with numerous smaller openings to achieve the desired amount of surface ventilation.

47 Claims, 2 Drawing Sheets

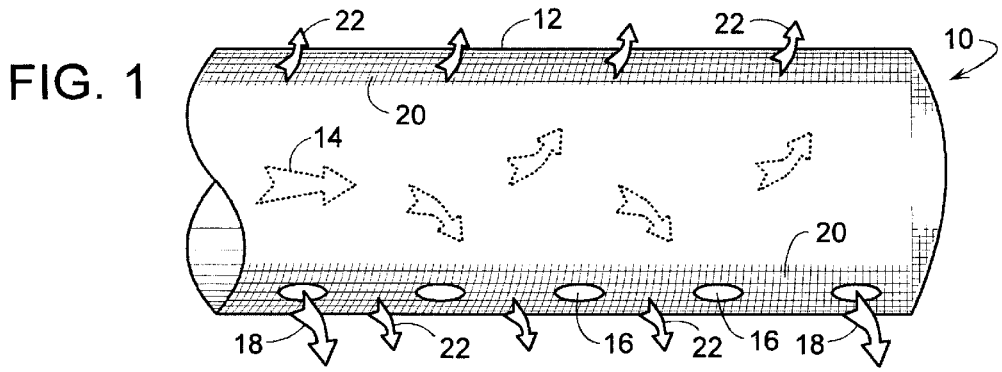
FIG. 1
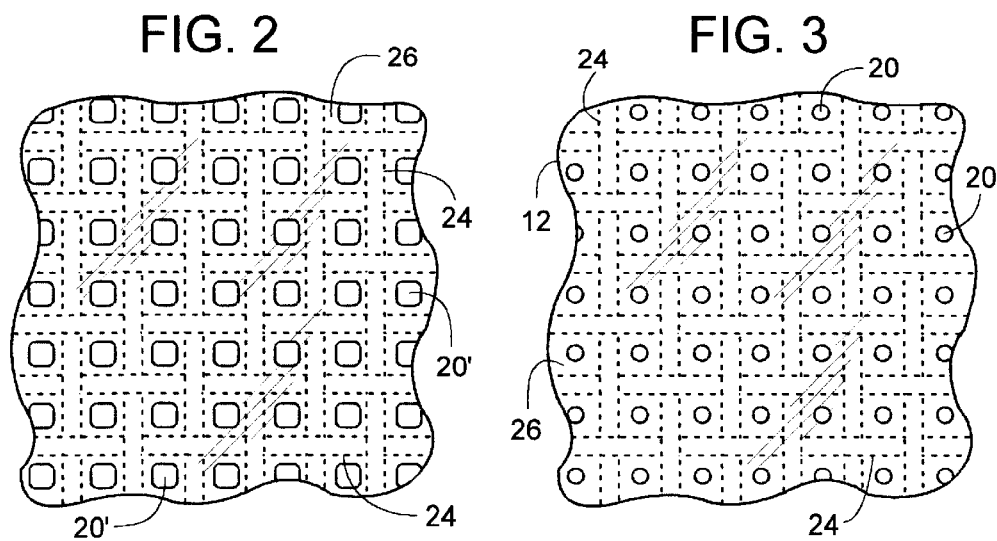
FIG. 2
FIG. 3
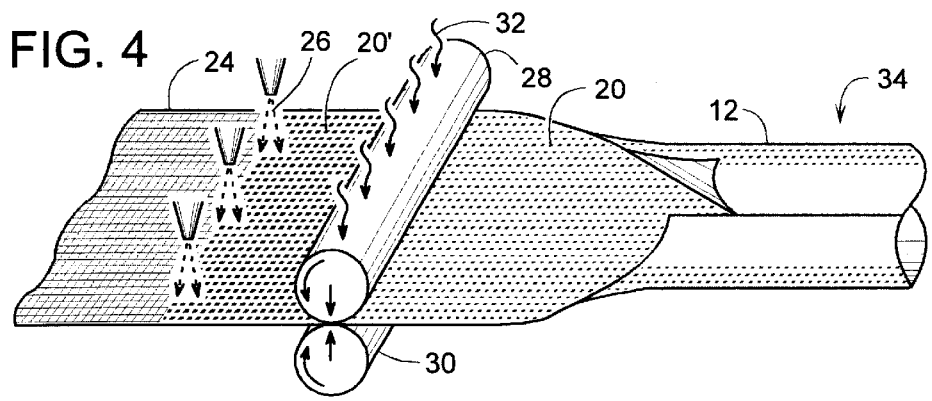
FIG. 4

PLIABLE AIR DUCT WITH DUST AND CONDENSATION REPELLENCY

BACKGROUND OF THE INVENTION

1. Field of the Invention

The subject invention generally pertains to pliable air ducts and more specifically to the air permeability of such a duct.

2. Description of Related Art

In HVAC systems (heating, ventilating, air conditioning), conditioned supply air discharged from a blower is often conveyed to various rooms or areas within a building by way of ductwork. Conventional ductwork is typically formed of sheet metal and is often installed above ceilings for convenience and aesthetics. But in warehouses, manufacturing plants and many other buildings, the ducts are suspended from the roof of the building and are thus exposed. This not only creates a poor appearance in many cases, but can create other problems as well.

For example, temperature differentials between an air duct and the air on either side of the duct wall can create condensation on both the interior and exterior of the duct. The presence of condensed moisture on the interior of the duct may form mold or bacteria that the duct then passes onto the room or other areas being supplied with the conditioned air. If an exposed sheet metal duct conveys relatively cool air, condensation can form on the exterior of the duct. The condensate may then drip onto the floor, inventory, and personnel below. The consequences of the dripping can range anywhere from a minor irritation to a dangerously slippery floor for the personnel, or complete destruction of the products it may drip on (especially in food-processing facilities).

Further, metal ducts with localized discharge registers have been known to create uncomfortable drafts and unbalanced localized heating or cooling within the building. In many food-processing facilities where the target temperature is 42 degrees Fahrenheit, a cold draft can be especially uncomfortable and perhaps unhealthy.

Many of the above problems associated with exposed metal ducts are overcome by the use of fabric ducts, such as DUCTSOX fabric ducts by Frommelt Safety Products Corporation of Milwaukee, Wisconsin. Such ducts typically have a fabric wall that is air permeable to broadly and evenly disperse the air into the room being conditioned or ventilated. If greater airflow in needed in certain areas, the fabric duct can be provided with additional discharge openings, such as air registers or cutouts in the fabric.

The porosity of conventional fabric can pass a substantial amount of air, which can be desirable in many applications where the airflow through the pores of the fabric is used primarily for evenly dispersing air into a room. However, some applications require airflow that is more directed toward certain areas of a room. In such cases, it may be desirable to have relatively large discharge openings provide most of the air airflow, while the pores of the fabric provide only enough airflow to inhibit dust and condensation from accumulating on the outer surface of the fabric material.

Unfortunately, it can be difficult to acquire an air duct material whose porosity provides an appropriately small amount of airflow, such as 2 cfm (two cubic feet per minute of air across one square-foot of material subject to a 0.02 psi air pressure differential). Standard fabric materials have been found to pass 40 cfm or more. Such materials have been calendared in an attempt to reduce the materials porosity. Although calendaring conventional fabric does reduce its porosity temporarily, much of the effect is lost after the material is washed. Thus, simply calendaring just any porous fabric is not a permanent solution to the problem.

SUMMARY OF THE INVENTION

An air duct consists of an air permeable material that passes air therethrough at a flow rate that is substantially less than what the air duct discharges through other larger openings.

In some embodiments, an air duct is made of a porous fabric that is plastic coated to reduce, but not eliminate, the fabric's porosity.

In some embodiments, an air duct includes a pliable sheet that includes a porous fabric base. The sheet is coated with a plastic that renders the sheet substantially impermeable to air. The sheet is provided with discharge openings for supplying air to a room, and is perforated with much smaller openings that help inhibit the formation of condensation or inhibit the accumulation of dust.

In some embodiments, an air duct with primary discharge openings and much smaller pores or perforations is made of a fabric with anti-microbial properties.

In some embodiments, an air duct is made of a plastic coated porous fabric that is calendered to reduce the fabric's porosity.

In some embodiments, the an air duct is made of a fabric sheet having numerous minute pores or perforations that convey only one to four $CFM/ft^2$ (cubic feet per minute per square-foot of material) when a 0.02 psia pressure differential exists across the sheet.

In some embodiments, an air duct material is perforated by displacing material rather than by removing a significant portion of it. Displacing material not only helps reinforce the periphery of each perforation, but also helps reduce the amount of scrap during the perforating process.

In some embodiments, an air duct includes a fabric sheet having a base material of polyester for strength and porosity, and having an acrylic or polyurethane coating to reduce or eliminate the base material's porosity.

BRIEF DESCRIPTION OF THE DRAWINGS

FIG. 1 is a partial side view of one embodiment of a fabric air duct that is able to inhibit at least some accumulation of dust or condensate.

FIG. 2 is an enlarged view of the fabric used in the air duct of FIG. 1, but with the fabric shown prior to it being compressed.

FIG. 3 shows the fabric of FIG. 2, but after the fabric is compressed to reduce its porosity.

FIG. 4 schematically illustrates a process of producing a fabric air duct that is able to inhibit at least some accumulation of dust or condensate.

DESCRIPTION OF THE PREFERRED EMBODIMENT

Figure 5:
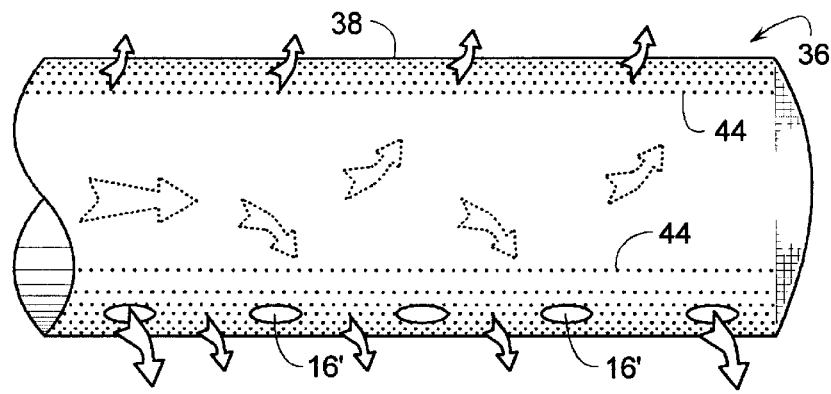
FIG. 5 is a partial side view of another embodiment of a fabric air duct that is able to inhibit at least some accumulation of dust or condensate.

An air duct 10, shown in FIG. 1, consists of a pliable sheet 12 in a tubular shape. Duct 10 is adapted to be suspended overhead to convey forced air 14 from a blower to specific rooms or desired areas within a building. Depending on the application, the air may be for ventilation purposes only, or may be conditioned by heat, cooling, filtering, humidifying, dehumidification, and various combinations thereof Most of the air delivered to the rooms comes from discharge openings 16 in duct 10, as indicated by airflow arrows 18. Openings 16 can assume a variety of forms including, but not limited to cutouts, discharge registers, and screens.

To help inhibit condensation or dust from accumulating on the surface of duct 10, the fabric wall between discharge openings 16 is provided with another set of much smaller openings 20. Openings 20 allow the fabric wall of the duct to breathe in the areas between discharge openings 16. A slight current of air 22 passing outward through the duct wall may help keep dust from settling on the exterior of the duct. But also, when duct 10 is conveying cool air, a small current of cool air passing through the duct's fabric wall tends to keep the warmer room air slightly away from the exterior surface of duct 10. Thus, moisture in the warmer room air is less likely to condense on the surface of duct 10.

The actual size, number, and spacing of smaller openings 20 can vary; however, there does appear to be an optimum design range. The relative open areas of openings 16 and 20 should allow about ten percent (preferably less than more) of supply air 14 to pass through smaller openings 20 and about ninety percent through discharge openings 16. Sheet 12 should preferably pass one to four CFM/ft² with a 0.02-psi pressure differential across sheet 12 (i.e., 0.02 pounds per square inch of air pressure should force one to four cubic feet of air across a one square-foot of sheet material every minute). Higher airflow rates through smaller openings 20 reduce the amount of air that discharge openings 16 can direct to specific areas, while lower airflow rates are less effective at reducing condensation or dust. In some cases, positive results are achieved when openings 16 are able to pass more than twenty times as much air as smaller openings 20. Moreover, the distribution of openings 20 should be sufficiently dense to provide an even flow of air through sheet 12. To avoid having smaller openings 20 direct too much airflow in any particular direction, openings 20 are preferably distributed over nearly the full circumference or perimeter of duct 10.

To achieve appropriate airflow characteristics, sheet 12 may consist of a fabric base material 24 with a plastic coating 26, as shown in FIG. 2. In some embodiments, fabric 24 is a porous woven material, such as polyester. Coating 26, such as an acrylic or polyurethane coating, is applied to fabric base 24 to reduce but not eliminate the porosity of sheet 12. If the resulting openings 20' are too large, as shown in FIG. 2, compressing or calendaring sheet 12 can reduce their size. Compressing sheet 12 forces coating 26 into openings 20' until the open area of openings 20' are reduced as indicated by openings 20 of FIG. 3. Coating 26 tends to maintain the desired size of openings 20' even after the material is washed.

The process of producing sheet 12 is schematically illustrated in FIG. 4. Applying coating 26 is schematically illustrated to encompass conventional coating processes that are well known to those skilled in the art. Reducing the size of openings 20' by compression can be achieved by a calendering process where sheet 12 is compressed between two rollers 28 and 30. In some cases, applying heat 32 to at least one of the rollers softens coating 26, which may help in permanently reducing the size of openings 20'. Once openings 20 are of an appropriate size, sheet 12 can be formed into a tubular shape 34. In some cases, coating 26 and/or fabric material 24 provides appreciable antimicrobial properties as determined by standard tests, such as AATCC Method 100 (where AATCC stands for the American Association of Textile Chemist and Colorists, of Research Triangle Park, N.C.). Coating 26 and/or fabric material 24 can also render sheet 12 flame retardant, whereby sheet 12 is self-extinguishing.

Figure 8:
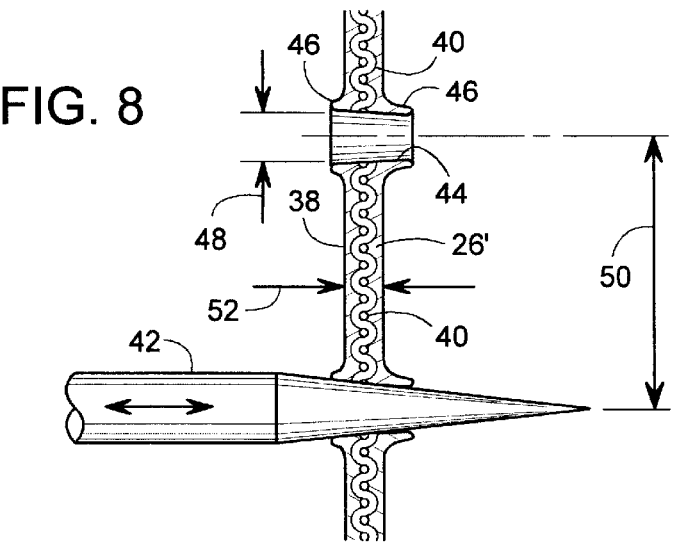
FIG. 8 is a cross-sectional view taken along line 8—8 of FIG. 7 while the fabric is being perforated.
Figure 6:
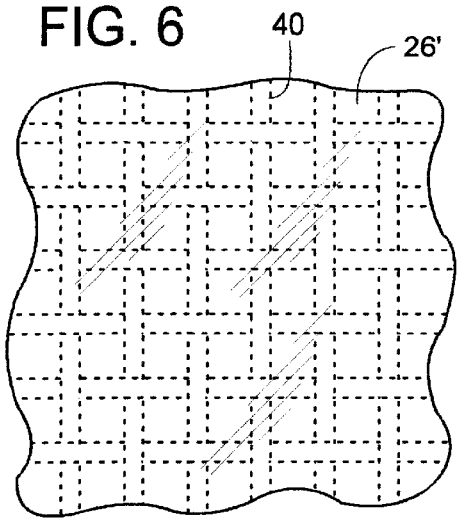
FIG. 6 is an enlarged view of the fabric used in the air duct of FIG. 5, but with the fabric shown prior to it being perforated.
Figure 7:
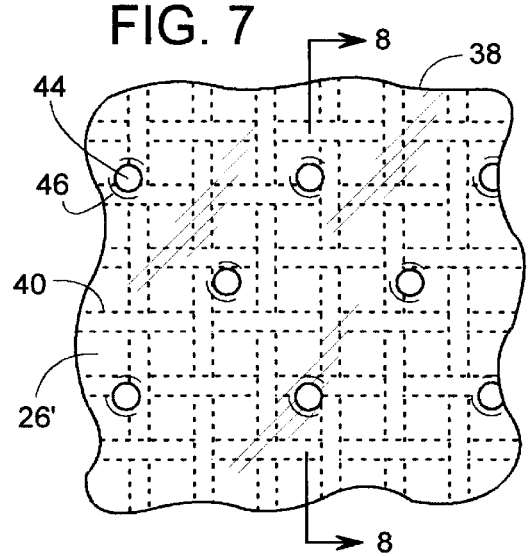
FIG. 7 shows the fabric of FIG. 6, but after the fabric is perforated.

In an alternate embodiment, shown in FIGS. 5–8, a duct 36 includes a pliable sheet 38 that may begin as a porous fabric base material 40. The fabric base material 40 is then sealed with a plastic coating 26', which substantially eliminates the porosity of sheet 38, as shown in FIG. 6. To allow sheet 38 to breathe, a tool 42 perforates sheet 38 to create numerous perforations 44 that are significantly smaller than discharge openings 16', as shown in FIGS. 5 and 8. In some embodiments, tool 42 is a needle that creates perforations 44 by displacing material, rather than by just removing material. In this way, built-up material 46 forms around the periphery of each perforation 44, with the volume of material 46 being generally equal to the void of each perforation 44. Such a process reduces scrap and at the same time may avoid weakening a perforation's circumference.

Just as with the embodiment of FIGS. 1–4, the size, number, shape and spacing of perforations 44 of FIGS. 5–8 can vary. However, in preferred embodiments, perforations 44 have an open span 48 or effective diameter of less than 0.1 inches and are distributed at a spacing 50 that is greater than a nominal thickness 52 of sheet 38 but less than 0.5 inches. The term, "effective diameter" equals the square-root of a hole's open area times two and divided by the square-root of one divided by pi (effective diameter=$2(A/3.14)^{0.5}$). In some cases, desirable results may be achieved when the effective diameter of perforations 44 is less than thickness 52, and perforations 44 have a distribution of 100 to 2000 perforations per square-inch.

Although the invention is described with reference to a preferred embodiment, it should be appreciated by those skilled in the art that various modifications are well within the scope of the invention. For example, pliable sheet 38 does not necessarily have to include a fabric base. Sheet 38 could simply be a pliable air impermeable plastic sheet that is perforated with micro-perforations or pinholes to achieve desired flow characteristics. Therefore, the scope of the invention is to be determined by reference to the claims that follow.

I claim:

1. An air duct, comprising a pliable sheet configured to convey air, wherein the pliable sheet includes a fabric base material that is porous and a plastic coating on the fabric base material that reduces the porosity of the fabric base material yet leaves the pliable sheet porous, wherein the pliable sheet is formed into a tubular shape and wherein the air duct defines a plurality of discharge openings that provide a first open area and the porosity of the pliable sheet provides a second open area with the first open area being greater than the second open area.

2. The air duct of claim 1, wherein the first open area is at least twice as great as the second open area.

3. The air duct of claim 1, wherein the fabric base material consists of polyester.

4. The air duct of claim 1, wherein the plastic coating consists of an acrylic.

5. The air duct of claim 1, wherein the plastic coating consists of polyurethane.

6. The air duct of claim 1, wherein the pliable sheet is anti-microbial.

7. The air duct of claim 1, wherein the pliable sheet is at least flame retardant.

8. The air duct of claim 1, wherein the porosity of the pliable sheet is adapted to convey air therethrough at a rate of one to four $CFM/ft^2$ when a 0.02 psia pressure differential exists across the pliable sheet.

9. An air duct, comprising a pliable sheet in a tubular shape to convey air, wherein the air duct defines a plurality of discharge openings each of which provide a first open area, and the pliable sheet defines a plurality of perforations each of which provide a second open area, such that the first open area is greater than the second open area and the plurality of perforations are spaced apart at a distance greater than the thickness of the pliable sheet with the pliable sheet being substantially impermeable to air between adjacent perforations.

10. The air duct of claim 9, further comprising a quantity of displaced material surrounding each of the plurality of perforations, wherein the quantity of displaced material is of sufficient volume to substantially fill the plurality of perforations.

11. The air duct of claim 9, wherein a diameter of each of the plurality of perforations is less than $\frac{1}{10}$ of an inch with the distance being less than a half-inch.

12. The air duct of claim 9, wherein the first open area is at least twice as great as the second open area.

13. The air duct of claim 9, wherein the fabric base material consists of polyester.

14. The air duct of claim 9, wherein the plastic coating consists of an acrylic.

15. The air duct of claim 9, wherein the plastic coating consists of polyurethane.

16. The air duct of claim 9, wherein the pliable sheet is anti-microbial.

17. The air duct of claim 9, wherein the pliable sheet is at least flame retardant.

18. The air duct of claim 9, wherein the plurality of perforations allow the pliable sheet to convey air therethrough at a rate of one to four $CFM/ft^2$ when a 0.02 psia pressure differential exists across the pliable sheet.

19. The air duct of claim 9, wherein the pliable sheet includes a fabric base with a plastic coating.

20. The air duct of claim 9, wherein the tubular shape has a circumference and the plurality of perforations are distributed over most of the circumference.

21. The air duct of claim 9, wherein the plurality of discharge openings is able to pass more than twenty times as much air as the plurality of perforations.

22. The air duct of claim 9, wherein the plurality of perforations have a distribution of between 100 and 2000 perforations per square-inch.

23. The air duct of claim 9, wherein each perforation of the plurality of perforations has an effective diameter that is less than a material thickness of the pliable sheet.

24. A method of creating an air duct, comprising:
applying a plastic coating on a fabric base material to create a pliable sheet that is air permeable;
applying pressure to the pliable sheet to reduce its air permeability; and configuring the pliable sheet to convey air.

25. The method of claim 24, further comprising forming the pliable sheet into a tubular shape.

26. The method of claim 24, further comprising heating the pliable sheet while applying pressure to the pliable sheet.

27. The method of claim 26, wherein heating the pliable sheet involves heating one side of the pliable sheet more than an opposite side of the pliable sheet.

28. The method of claim 24, wherein applying pressure to the pliable sheet involves calendering.

29. The method of claim 24, wherein the air permeability of the pliable sheet is such that the pliable sheet is able to convey air therethrough at a rate of one to four $CFM/ft^2$ when a 0.02 psia pressure differential exists across the pliable sheet.

30. The method of claim 24, wherein the fabric base material consists of polyester.

31. The method of claim 24, wherein the plastic coating consists of an acrylic.

32. The method of claim 24, wherein the plastic coating consists of polyurethane.

33. The method of claim 24, wherein the pliable sheet is anti-microbial.

34. The method of claim 24, wherein the pliable sheet is at least flame retardant.

35. A method of creating an air duct, comprising:
applying a plastic coating on a fabric base material to create a pliable sheet;
perforating the pliable sheet to create a plurality of perforations having a first open area; and
forming the pliable sheet to help create a tube that defines a plurality of discharge openings having a second open area that is greater than the first open area.

36. The method of claim 35, wherein upon perforating the pliable sheet, the plurality of perforations are created more by displacing material within the pliable sheet than by removing material from the pliable sheet.

37. The method of claim 35, wherein the second open area is at least twice as great as the first open area.

38. The method of claim 35, wherein the fabric base material consists of polyester.

39. The method of claim 35, wherein the plastic coating consists of an acrylic.

40. The method of claim 35, wherein the plastic coating consists of polyurethane.

41. The method of claim 35, wherein the pliable sheet is anti-microbial.

42. The method of claim 35, wherein the pliable sheet is at least flame retardant.

43. The method of claim 35, wherein the plurality of perforations allow the pliable sheet to convey air therethrough at a rate of one to four $CFM/ft^2$ when a 0.02 psia pressure differential exists across the pliable sheet.

44. The method of claim 35, wherein the tubular shape has a circumference and the plurality of perforations are distributed over most of the circumference.

45. The method of claim 35, wherein the plurality of discharge openings is able to pass more than twenty times as much air as the plurality of perforations.

46. The method of claim 35, wherein the plurality of perforations have a distribution of between 100 and 2000 perforations per square-inch.

47. The method of claim 35, wherein each perforation of the plurality of perforations has an effective diameter that is less than a material thickness of the pliable sheet.

* * * * *